Figure 7:
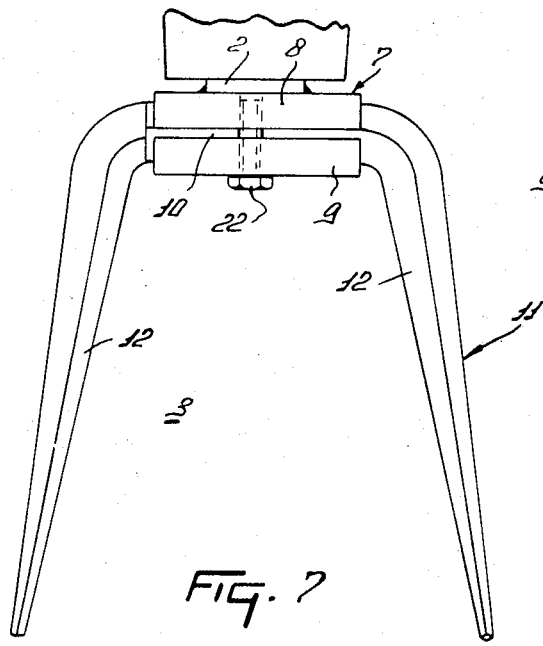

United States Patent
Van Der Lely

[11] 3,774,687
[45] Nov. 27, 1973

[54] SOIL CULTIVATORS

[76] Inventor: Cornelis Van Der Lely, 7, Bruschenrain, Zug, Switzerland

[22] Filed: May 27, 1971

[21] Appl. No.: 147,439

[30] Foreign Application Priority Data
May 28, 1970 Netherlands.................... 7007690

[52] U.S. Cl.................... 172/49, 172/59, 172/111, 172/123, 172/700, 172/734, 172/743
[51] Int. Cl............................................ A01b 33/00
[58] Field of Search...172/47-49, 59, 110-111, 169, 172/522-526, 734-735, 739, 741-742, 540, 550, 556, 681, 685, 691, 692, 700, 703, 726, 740, 743, 753, 763, 773, 774, 548, 123; 56/295; 287/54.1, 55, 56, 111

[56] References Cited
UNITED STATES PATENTS

| | | | |
|---|---|---|---|
| 3,091,044 | 5/1963 | Penote et al.................. | 172/735 X |
| 3,084,748 | 4/1963 | Heeren et al................ | 172/59 |
| 2,755,718 | 7/1956 | Arndt........................... | 172/111 |
| 2,341,830 | 2/1944 | Uddenborg................... | 172/550 |
| 3,599,729 | 8/1971 | Greemore..................... | 172/741 |
| 1,951,220 | 3/1934 | Tarr............................. | 287/111 |

FOREIGN PATENTS OR APPLICATIONS

| | | | |
|---|---|---|---|
| 229,073 | 1/1963 | Austria........................ | 172/59 |
| 442,799 | 4/1926 | Germany..................... | 172/523 |
| 583,613 | 12/1946 | Great Britain................ | 172/735 |
| 29,997 | 12/1898 | Great Britain................ | 172/49 |
| 6,805,358 | 10/1969 | Netherlands................. | 172/735 |
| 13,381 | 3/1911 | France........................ | 172/59 |

Primary Examiner—Robert E. Pulfrey
Assistant Examiner—Eugene H. Eickholt
Attorney—Mason, Mason & Albright

[57] ABSTRACT

A cultivator has a frame supporting a plurality of rotatable soilworking members, each with a plurality of tines. The tines have a soil working portion and a fastening portion which is secured to an elongated tine support on its respective soil-working member. The fastening portion of the tine is secured a substantial distance along the length of the tine support to resist displacement.

12 Claims, 10 Drawing Figures

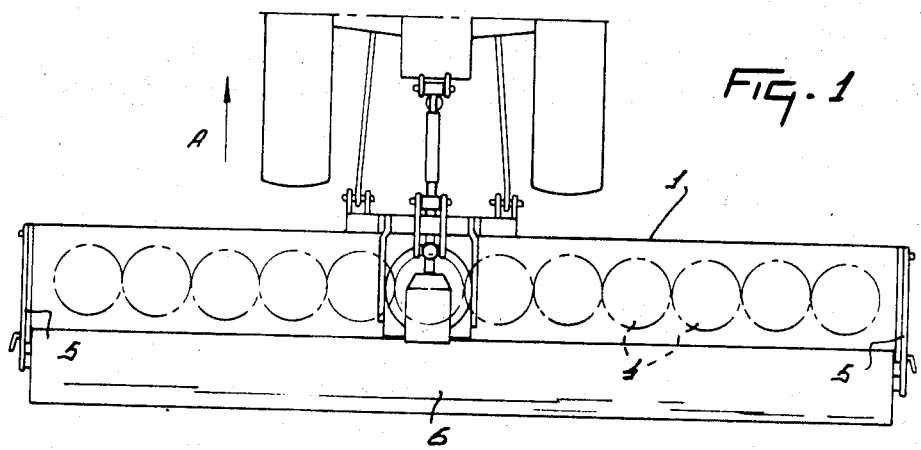
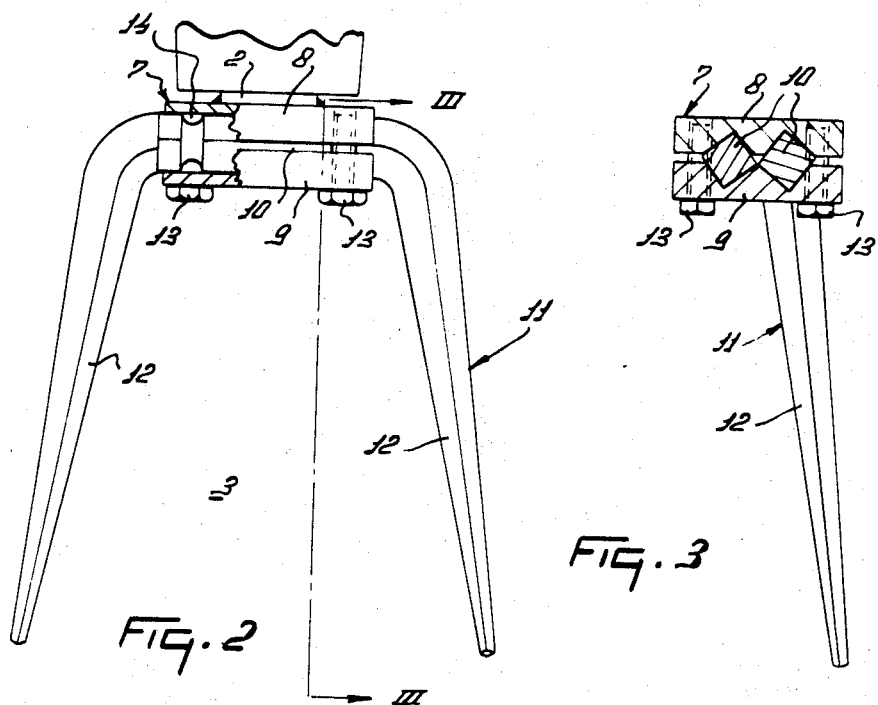

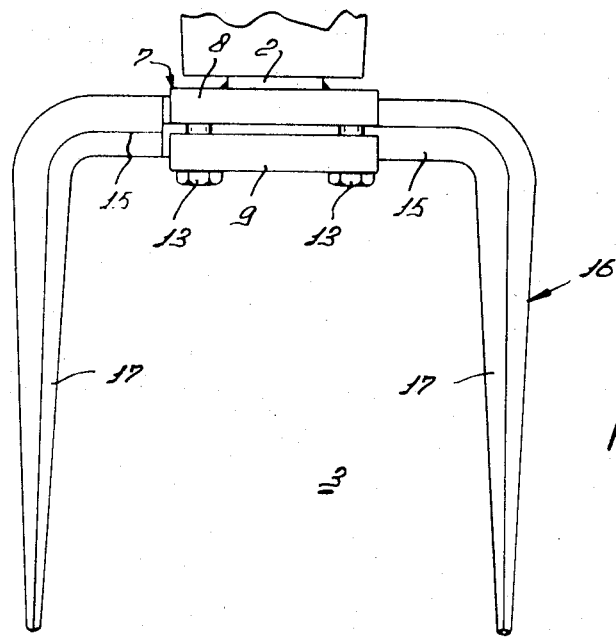
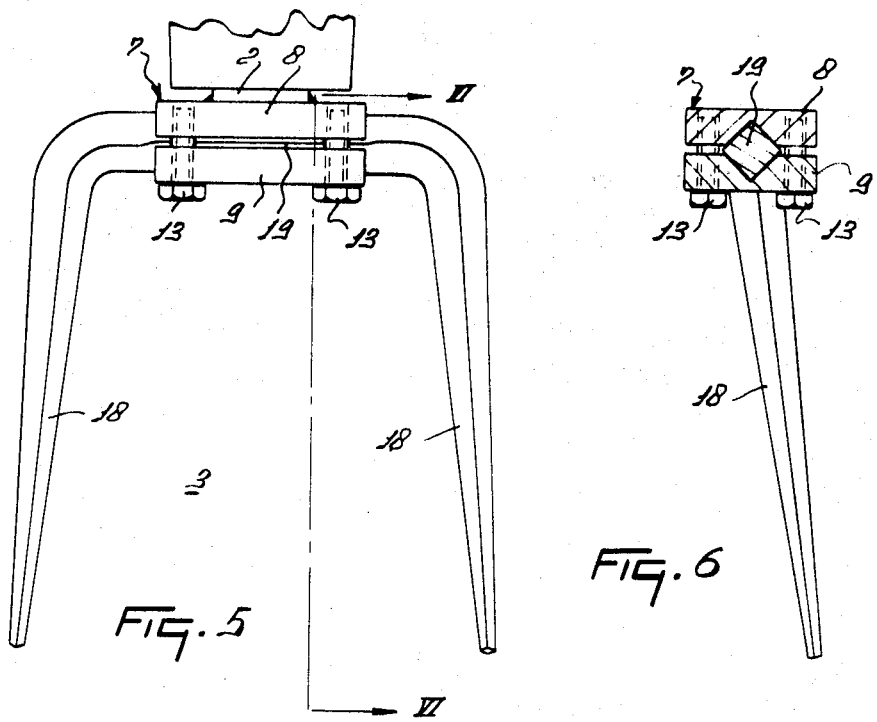

PATENTED NOV 27 1973

3,774,687

SHEET 3 OF 3

INVENTOR
CORNELIS VAN DER LELY
BY
Mason, Mason & Albright
Attorneys

SOIL CULTIVATORS

This invention relates to soil cultivating implements or cultivators of the kind that comprise a frame and a plurality of soil working members that are mounted on the frame so as to be rotatable about upright axes, each soil working member having at least two tines each of which includes a soil working portion and a fastening portion, the latter portion being secured to an elongated tine support.

Known rotary cultivators of this kind suffer from the disadvantage that their tines are frequently broken off, lost or loosened because the soil working members are incapable of withstanding the heavy loads that are placed upon them during operation. It is an object of the invention to provide a simple but strong and effective construction of the tines and their mountings which is such that breakages, losses and loosening of tines is very much reduced.

According to the invention, there is provided a soil cultivator of the kind set forth, wherein the fastening portion extends at least over the whole length of a support.

Figure 9:
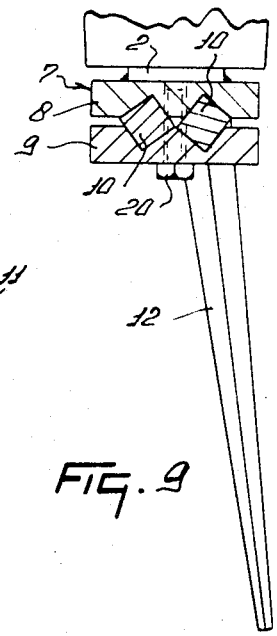
Figure 8:
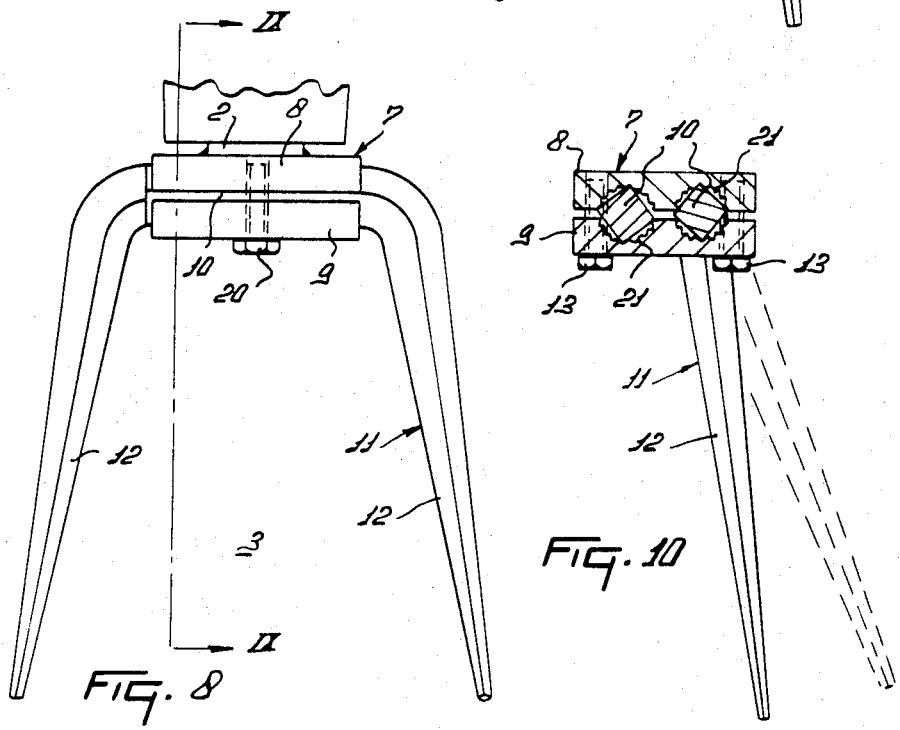
Figure 10:
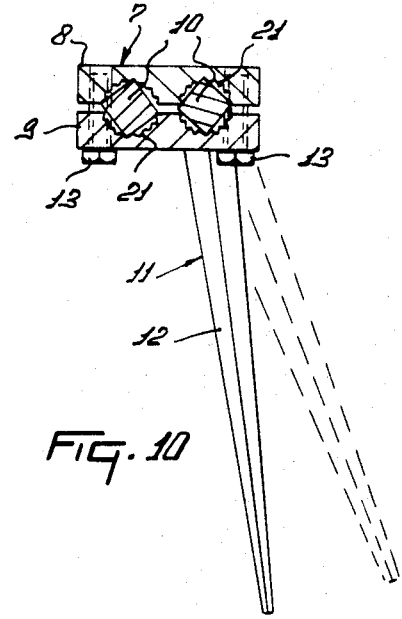

For a better understanding of the invention, and to show how the same may be carried into effect, reference will now be made, by way of example, to the accompanying drawings, in which:

FIG. 1 is a diagrammatic plan view of a cultivating implement or cultivator mounted at the rear of an agricultural tractor, the cultivator being provided with tines that are arranged in accordance with the invention, FIG. 2 is a part-sectional side elevation, to a greatly enlarged scale, of a soil-working member of the cultivator of FIG. 1 showing the arrangement of tines in that member, FIG. 3 is a section taken on the line III—III of FIG. 2, FIG. 4 substantially corresponds to FIG. 2 but shows an alternative construction, FIG. 5 shows a further alternative construction, FIG. 6 is a section taken on the line VI—VI of FIG. 5, FIG. 7 again substantially corresponds to FIG. 2 and shows a further alternative construction, FIG. 8 shows another alternative construction, FIG. 9 is a section taken on the line IX—IX of FIG. 8, and FIG. 10 substantially corresponds to FIGS. 3, 6 and 9 but shows an alternative construction in which the positions of the tines are angularly adjustable.

Referring to FIGS. 1 to 3 of the drawings, the soil cultivating implement or cultivator which is illustrated has a frame which is afforded principally by a hollow beam 1 that extends substantially perpendicularly transverse to the intended direction of operative travel of the cultivator which is indicated by an arrow A in FIG. 1. A plurality of soil working members 3, of which there are twelve in the diagrammatically illustrated cultivator, are rotatably journalled beneath the frame beam 1 at regular intervals along the length of that beam with the aid of corresponding upright shafts 2 each of which carries a corresponding toothed pinion 4 at its upper end inside the beam 1. The pinions 4 have straight spur teeth (i.e., they are not spiral toothed pinions) and, as can be seen in outline in FIG. 1 of the drawings, the teeth of each pinion 4 are in mesh with those of its neighbour or both of its neighbours so that each soil working member 3 will rotate in opposite direction to its neighbour, or both its neighbours, during the use of the cultivator. A soil compressing member in the form of a roller 6 is mounted so as to be rotatable about a substantially horizontal axis at the rear of the cultivator and is connected to the frame thereof by two arms 5 that are pivotable upwardly and downwardly with respect to the cultivator frame and that can be retained in any chosen angular setting about their pivotal axis with respect to the frame with the aid of substantially horizontal locking pins. It will thus be appreciated that the roller 6 serves not only to compress or flatten the soil worked by the members 3 but also to determine the working depth of those members, that is to say, the depth of penetration of their tines into the soil which is possible.

Each soil working member 3 includes a tine support 7 which is elongated in one direction (see FIGS. 2 and 3) and which is afforded principally by an upper plate portion 8 and a lower plate portion 9. Both plate portions 8 and 9 are substantially horizontally disposed and the upper plate portion 8 is welded, or may be otherwise rigidly secured, to the lowermost end of the corresponding upright shaft 2. In the cultivator which is being described, each soil working member 3 has two tines 11 that are located substantially symmetrically opposite to one another with respect to the upright axis of rotation of the soil working member 3 concerned. Accordingly, the plate portions 8 and 9 are formed with right-angled gooves or recesses that are so disposed relative to one another that, when the plate portions 8 and 9 are brought into register with one another, two substantially horizontally extending and substantially parallel holders of square of substantially square cross-section are formed. Although it is preferred to employ a square, or at least rectangular, cross-section for the holders, it will be realised that this is not essential and that other angular cross-sections would also be effective.

Each tine 11 has a fastening portion 10 and a soil working portion 12, the two portions 10 and 12 being integrally interconnected by a bend that should be larger than 90° in magnitude and that may desirably have a magnitude of about 110°. Each soil working portion 12 tapers gently from the bend of the tine 11 to the free end or tip of that portion, said portion being of angular, and preferably square, corss-section throughout its length. The fastening portion 10 of each tine is substantially horizontally disposed and has approximately the same length as that of the holder in which it is lodged. It will be realised that the length just mentioned is also approximately equal to the longer dimension of the corresponding tine support 7. Each fastening portion 10 is of the same angular cross-section, preferably square, as the soil working portion 12 to which it is integrally connected but it is of uniform cross-sectional area throughout its length and has a shape, and magnitude, such as to enable it to fit snugly in the holders that are formed between the plate portions 8 and 9. Since the bends interconnecting the tine portions 10 and 12 are preferably of greater magnitude than 90°, the soil working portions 12 of the tines diverge gently relative to one another in a downward direction and the arrangement of the soil working members 3 in the cultivator will usually be such that the perpendicular distance between the tips of the portions 12 is greater than the perpendicular spacing between the shafts 2 of neighbouring soil working members 3 so that the strips of the ground worked by the tines 11 of the various soil working members 3 overlap one another. With this arrangement, it is necessary that the tines 11 of neighbouring soil working members 3 should be angularly staggered to some extent so that the tines do not foul one another during operation of the cultivator.

Substantially vertical bolts 13 are provided in the tine supports 7 near the longitudinal ends of those supports, the arrangement being such that the substantially vertical bores through which the bolts 13 extend overlap the substantially horizontal holders in which the fastening portions 10 of the tines 11 are disposed. Accordingly, the fastening portions 10 are provided, at locations which will register with the bolts 13, with circumscribing recesses 14 into which the shanks of the bolts 13 intrude in the manner which can be seen best in FIG. 3 of the drawings. There are four bolts 13 for each soil working member 3 and, when the bolts 13 are tightened, the fastening portions 10 are firmly clamped in their holders between the upper and lower plate portions 8 and 9 of the tine supports 7 and are prevented from substantially horizontal longitudinal displacement by the entry of the shanks of the bolts 13 in the recesses 14. In the embodiment shown in FIGS. 2 and 3 of the drawings, the fastening portion 10 of each tine 11 has a length which is equal to not less than half the length of the corresponding soil working portion 12. It will be noted from FIG. 3 of the drawings that the disposition of the soil working portions 12 of the tines 11 is such that each such soil working portion 12 is inclined either forwardly, or rearwardly, with respect to the intended direction of rotation of the soil working member 3 concerned so that each soil working portion 12 may be said to occupy either a "trailing" or "leading" disposition.

FIG. 4 of the drawings shows an embodiment in which tines 16 are provided whose fastening portions 15 are longer than those of the previously described fastening portions 10. In fact, each fastening portion 15 has a length which is approximately one-and-a-half times that of tis holder and thus one-and-a-half times the longitudinal dimension of the corresponding tine support 7. In this embodiment, the tines 16 have soil working portions 17 that are integrally connected to the fastening portions 15 by bends having magnitudes of about 90°.

FIGS. 5 and 6 of the drawings show an embodiment in which two tines 18 are formed as an integral pair in the shape (as seen in FIG. 5) of an inverted U-profiled bracket. The crossbar 19 of this bracket is clamped in a single holder between the upper and lower plate portions 8 and 9 by the four bolts 13 but the angular offset of the tines 18 themselves relative to the crossbar 19 makes it unnecessary for the bolts 13 positively to prevent longitudinal displacement of the crossbar 19 relative to the tine support 7. The tines 18 themselves are similar to the previously described tines 11.

FIG. 7 shows a construction which is similar to that illustrated in FIGS. 2 and 3 of the drawings except that only two bolts 22 are employed instead of the four bolts 13. The two substantially vertical bolts 22 are disposed at relatively opposite sides of the shaft 2 concerned and the fastening portions 10 of the tines 11 are formed with single recesses (equivalent to the previously described recesses 14) approximately midway along their lengths for co-operation with the shanks of the bolts 22 to prevent longitudinal displacement in the holders.

FIGS. 8 and 9 of the drawings show a construction in which only a single bolt 20 is employed. This substantially vertical bolt 20 enters a screw-threaded bore formed axially at the lowermost end of the shaft 2 concerned and, when it is tightened, the lower plate portion 9 clamps the fastening portions 10 of the tines firmly in their holders and prevents longitudinal displacement of those portions 10. To this end, both fastening portions 10 are provided with recesses approximately midway along their lengths as in the embodiment of FIG. 7, the shank of the single central bolt 20 protruding laterally into both of the recesses.

FIG. 10 illustrates a construction in which the grooves or recesses in the plate portions 8 and 9 that form the holders for the fastening portions 10 of the tines 11 are provided with a series of notches or teeth 21 so that, after temporarily loosening the bolts 13, the fastening portions 10 of the tines 11 concerned can be turned about their substantially horizontally extending longitudinal axes to enable the square or other angular shapes thereof to co-operate with different notches or teeth 21. These new positions will be maintained upon re-tightening the bolts 13. FIG. 10 of the drawings shows one position of the soil working portion 12 of one of the tines 11 in full lines and another more inclined possible position thereof in broken lines. The angularity of the tines 11 can thus be changed without difficulty to suit the particular work to be undertaken by the cultivator and the nature and condition of the soil that the tines will meet.

In the use of the cultivating implement or cultivator that is shown diagrammatically in FIG. 1 of the drawings, a coupling member at its front is connected to the three-point lifting device or hitch of an agricultural tractor and it is moved over the soil that is to be cultivated in the direction A. A gear box whose output rotates all of the soil working members 3 through the intermediary of the toothed pinions 4 has its rotary input shaft in driven connection with the power take-off shaft of the same tractor or other vehicle that moves the cultivator, said gear box being located approximately centrally on top of the hollow frame beam 1 as can be seen in outline in FIG. 1 of the drawings. The tines of the soil working members 3 are preferably arranged as shown in FIG. 3 or FIG. 6 of the drawings in which they occupy trailing dispositions with respect to the directions of rotation of the members 3 of which they form parts. As previously mentioned, the strips of land worked by the various members 3 preferably overlap one another to some extent so that a single broad strip of land is, in effect, cultivated during a single traverse of a field. If desired, it is possible to provide a construction in which the fastening portions 10 of the tines can be shifted longitudinally in their holders to increase or decrease the perpendicular distance between the soil working portions of the tines. For example, the soil working portions can be provided with a plurality of spaced apart recesses 14 (FIG. 2) along their lengths so that it is possible to perform axial displacements as just mentioned while ensuring that at least one recess 14 still co-operates with at least one bolt 13. Alterations in the effective working diameters of the members 13 are sometimes desirable to enable them to deal with different soils under different conditions in an optimum manner. The roller 6 or other soil compressing member that is arranged immediately behind the soil working members 3 flattens and consolidates the crumbled soil and the cultivator bears upon the ground through the intermediary of this roller so that the whole weight thereof is not borne by the lifting device ot hitch of the operating tractor or other vehicle and so that the level of the axis of rotation of the roller 6 can be adjusted relative to the level of the hollow frame beam 1 to determine the depth of penetration of the tines into the soil.

The specific construction and mounting of the cultivator tines that has been described above is very reliable and effective and has proved to be of considerable value in rotary cultivators with particular regard to durability of the soil working members and the finely crumbled soil structure which they produce during operation.

While various features of the cultivator and various soil working members that have been described, and that are illustrated in the drawings, will be set forth in the following claims as inventive features, it is to be noted that the invention is not necessarily limited to these features and that it encompasses all of the features that have been described and illustrated both individually and in various combinations.

Having this described my invention, what I claim as new and desire to secure by Letters Patent of the United States is:

1. A soil cultivator having a frame supporting a plurality of soil working members rotatable about upwardly extending axes, said soil working members being arranged side by side in a transverse row and being connected to drive means to normally work overlaping strips of soil during operation, each of said soil wroking members comprising a pair of tines positioned at opposite ends of a substantially horizontal, elongated tine support, each of said tines having an upper fastening portion secured within its respective tine support and said fastening portion being connected to a lower soil working portion, the latter portion extending substantially straight and downwardly in a direction oblique to the vertical, whereby during operation, said soil working portion trails relative to the direction of rotation of its respective tine support, the fastening portions of said pair of tines being located side by side and engaged in a recessed holder of thier support, said recessed holder comprising grooves that slideably receive the fastening portions of the tines, means for retaining said fastening portions in a pluraltiy of different positions in their support and said soil working portions being displaceable to vary the perpendicualr distance between them.

2. A cultivator as claimed in claim 1, wherein the fastening portion of each tine has an angular profile that is retainable in said grooves in a plurality of different positions by securing said fastening portion in a corresponding angular setting about its lown longitudinal axis relative to said support.

3. A cultivator as claimed in claim 1, wherein the fastening portions of said pair of tines extend at substantially the same horizontal level.

4. A cultivator as claimed in claim 1, wherein the fastening portions of said pair of tines extend substantially parallel to one another.

5. A cultivator as claimed in claim 1, wherein the fastening portion of each tine has a length that at least equals approximately half the length of the soil working portion of said tine.

6. A cultivator as claimed in claim 1, wherein an angle of at least 90° is enclosed between the relatively inclined fastening portion and the soil working portion of each tine.

7. A cultivator as claimed in claim 6, wherein the angle enclosed between said portions is about 110°.

8. A cultivator is claimed in claim 1, wherein the fastening portions of said tines are longitudinally movable to any one of a number of different positions relative to their respective tine support and fixable in chosen positions by bolt means.

9. A cultivator as claimed in claim 8, wherein each tine fastening portion has a plurality of recesses and bolt means is fitted in said support with at least one bolt of said bolt means protruding into at least one fo said recesses to maintain the fastening portion of the respective tine in a corresponding longitudinal setting.

1. A cultivator as claimed in claim 1, wherein said tines are of angular cross-section, and their soil working portions taper towards the free ends thereof.

11. A cultivator as claimed in claim 2, wherein said grooves form holders for said fastening portions and have a pluraltiy of teeth which cooperate with the angular profiles of said fastening portions, said teeth defining a plurality of different positions in which the fastening portions of said tines can be retained by turning the fastening portions about their own longitudinal axes and securing same in said supports.

12. A cultivator as claimed in claim 1, wherein the fastening portions of said tine enters one end of said support and terminates adjacent the opposite end of the support.

* * * * *